Jan. 9, 1945. T. I. RESS 2,367,140
FILM DRIVE MECHANISM
Filed Sept. 4, 1943
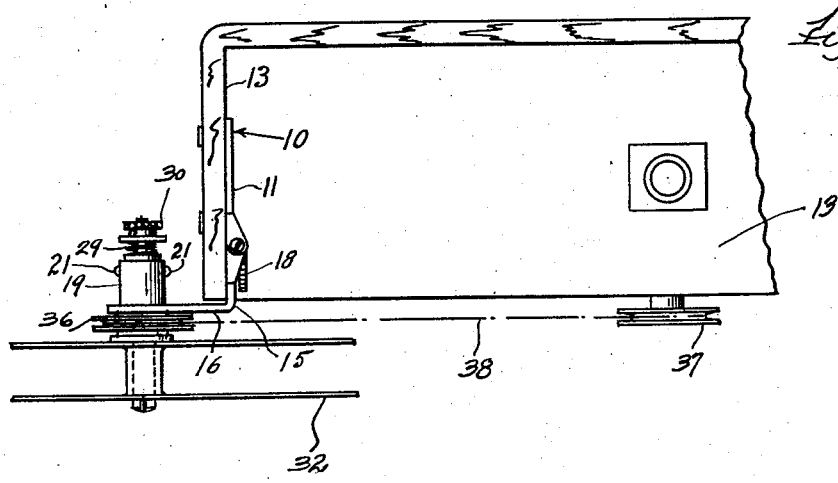
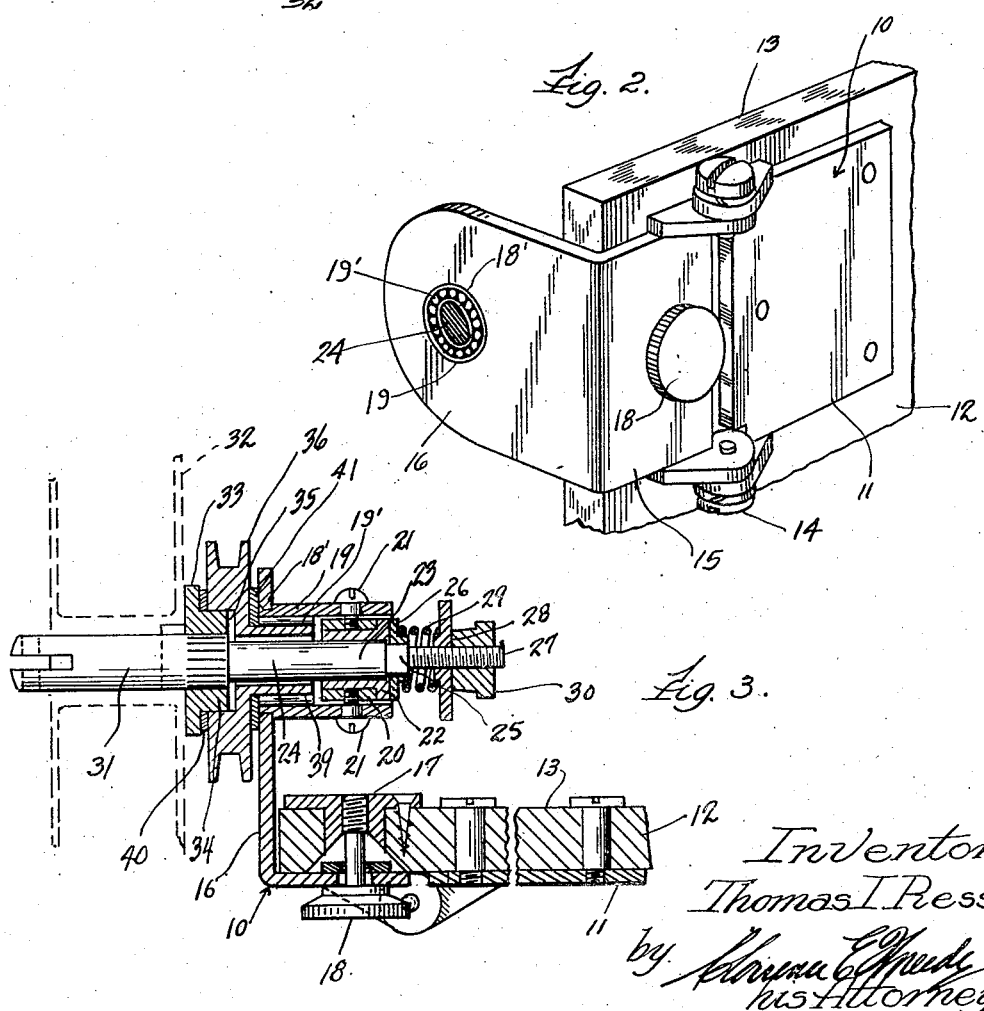
Inventor
Thomas I. Ress.
by
his Attorney

Patented Jan. 9, 1945

2,367,140

UNITED STATES PATENT OFFICE

2,367,140

FILM DRIVE MECHANISM

Thomas I. Ress, Chicago, Ill., assignor to De Vry Corporation, Chicago, Ill., a corporation of Illinois Application September 4, 1943, Serial No. 501,249

2 Claims. (Cl. 242—55)

This invention relates to certain new and useful improvements in film drive mechanism and more particularly drives for films of motion picture projecting apparatus having sound reproducing attachments, and has for its principal object the provision of an improved structure of this character which will be highly efficient in use and economical in manufacture.

In the art of film driving mechanism it is well known that the speed of the take-up reel decreases as the diameter of the film roll on the reel increases.

The main object of this invention is to provide a film take-up reel driving mechanism which will result in a constant tension on the film at all times during operation of the mechanism.

The present invention has as a further and equally important object the provision of a film driving mechanism in which the driving torque will increase as the speed of the take-up reel decreases due to an increase in the diameter of the film roll wound thereon.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a sectional view of a cabinet of a motion picture projecting apparatus showing my invention associated therewith;

Fig. 2 is a perspective view of the take-up reel supporting bracket; and

Fig. 3 is a sectional detail view of the take-up reel shaft assemble.

In the conception of my invention I have shown the same in association with a portable motion picture cabinet such as is shown and described in application Serial No. 483,095 filed on April 13, 1943, now Patent No. 2,358,692, Sept. 19, 1944. It is however understood that this illustration is merely to enable one to obtain a clear understanding of the invention. I, therefore, do not want to be limited to the use of my invention with such a cabinet, it being obvious that the invention has universal application in motion picture projecting machines in general.

The drawing illustrates the preferred form of construction of my invention. In the drawing a bracket structure is indicated at 10. The bracket structure forms no part of my invention and is substantially similar to that shown in the above referred to application.

Briefly the bracket structure includes a mounting plate 11 secured to a wall 12 of the projector cabinet 13. Hinged as at 14 to this plate is an arm 15 having an angled end portion 16. The wall 12 carries a threaded socket 17 adapted to receive a latch screw 18 carried by the arm 16 whereby to releasably latch the arm in the extended position shown (Fig. 2). When the arm is folded within the cabinet 13 the latch screw is disengaged from the socket 17.

At the outer end of the arm 16 is provided an opening 18' and seated in this opening is the end of a sleeve 19. Arranged in this sleeve 19 at the inner end portion thereof is a collar 20 pivotally connected to the sleeve 19 by pivot screws 21.

Arranged within this collar 20 is a bearing sleeve 22. Into this bearing sleeve 22 is journaled one end portion 23 of a shaft 24.

The shaft 24 has a reduced end portion 25 on which is mounted a retaining washer 26 in abutment with the bearing sleeve 22 (Fig. 3).

Extending from this reduced portion of the shaft 24 is a thread stud 27 on which is threaded a second retaining washer 28. Between the retaining washers 26 and 27 is an expansion spring 29. The washer 27 has threaded thereagainst a lock nut 30.

The shaft 24 has an enlarged end portion 31 on which is mounted in the usual manner the take-up reel 32.

Fixed to the shaft 24 is a flanged disc 33 having a hub 34 which projects into a recess 35 formed in the driven pulley 36.

This pulley 36 is driven by the driving wheel 37 through the medium of a driving belt 38.

The pulley 36 has a hub 39 which projects into a suitable bearing 19' mounted in the sleeve 19 (Fig. 3). Between the opposing faces of the disc 33 and the pulley 36 and those of the pulley 36 and the arm 16 are lubricated washers 40 and 41.

The shaft 24, by virtue of the structure just described is capable of oscillation and as the pulley 36, as I prefer to term it, floats or idles upon its bearing hub 34 it is clear that as the driver torque increases the frictional engagement between the disc 33 and the pulley 36 will proportionally increase and vice versa when the drive torque decreases with the resulting effect that the speed of the take-up reel will be constant or near constant as the load increases or decreases.

The simplicity of my invention is apparent from the foregoing, its efficiency in use having been by me demonstrated. I find that the same can be manufactured at a minimum of cost.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a take-up reel support, a bracket member, a mounting sleeve carried by an arm of the bracket member and extending laterally from said arm, a bearing mounted in said sleeve, means for connecting said bearing to said sleeve for oscillatory movement relative to said sleeve, a film reel mounting shaft having one end portion journaled in said bearing, a flanged disc having a hub fixed to said shaft, a driven pulley having a recess for the reception of said hub, said flanged disc and said pulley being adapted to have frictional driving connection with respect to each other, said shaft being freely journaled through said pulley, a threaded member on the aforementioned end portion of said shaft, and spring means disposed between said threaded member and said bearing for bearing said flanged disc into frictional engagement with said pulley, substantially as described.

2. A film reel support comprising a shaft on one end of which a film reel is adapted to be mounted, a driven pulley rotatable on said shaft, means providing a friction driving connection between the pulley and the shaft, a mounting bracket, a sleeve carried by said bracket, a bearing member mounted in said sleeve, means connecting the bearing member to the sleeve for oscillatory movement relative thereto, said shaft being journalled through said bearing member and floatingly supported through said sleeve by said bearing member, and means on said shaft and engaging said bearing member for maintaining said frictional driving connection between the pulley and said shaft.

THOMAS I. RESS.